Oct. 22, 1963    M. BISHOP    3,107,750
LOAD HANDLING VEHICLES

Filed April 23, 1962    3 Sheets-Sheet 1

Oct. 22, 1963  M. BISHOP  3,107,750
LOAD HANDLING VEHICLES
Filed April 23, 1962  3 Sheets-Sheet 3
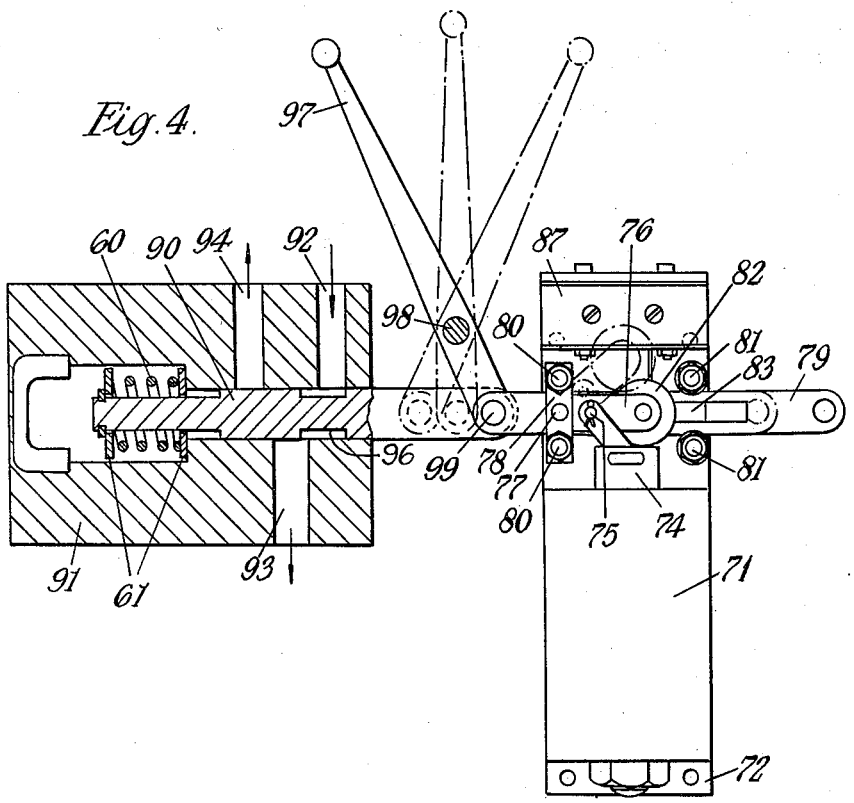

United States Patent Office 3,107,750
Patented Oct. 22, 1963

3,107,750
LOAD HANDLING VEHICLES
Morris Bishop, Rickmansworth, England, assignor to Lipton Products Limited, High Wycombe, Buckinghamshire, England
Filed Apr. 23, 1962, Ser. No. 189,413
9 Claims. (Cl. 187—9)

This invention relates to load handling vehicles and more particularly to so-called fork lift truck and similar vehicles of the kind by which goods may be raised and lowered to and from stacks, shelves and so forth and transported as required.

The general object of the invention is to enable the load carrier of such a vehicle to move automatically to any of a preselected series of heights as necessary.

According to the invention therefore a vehicle of the kind referred to comprises an attachment having a plurality of vertically separated units for sensing the height of the load carrier, a control unit for preselecting for operation a particular one of the sensing units, and a device for controlling, under the direction of the selected sensing unit, the position of a valve in the hydraulic circuit by which the load carrier is elevated.

Conveniently each sensing unit has a switch which is mechanically operated when the load carrier attains the corresponding height and the valve controlling device is electromagnetically operated so as to maintain the valve in its operative position only until a sensing unit switch is operated as aforesaid. Alternatively each sensing unit could incorporate a proximity switch of magnetically operating type, a photoelectrically operated switch or an ultrasonic operated switch. Also alternatively the valve controlling device could be operated hydraulically or by pneumatic pressure of vacuum via a solenoid valve responsive to operation of a sensing unit switch. The control unit conveniently comprises a series of selector circuits corresponding to the number of sensing units and each comprising a manual switch and a relay. Each such relay controls a main circuit which includes a solenoid for maintaining the hydraulic control valve in a particular predetermined position. Further the control unit may comprise a delay circuit such that after operation of any particular sensing unit the load carrier moves a further predetermined distance upwards as is necessary for stacking to allow the pallet to drop a short distance on to the stack.

Figure 1:
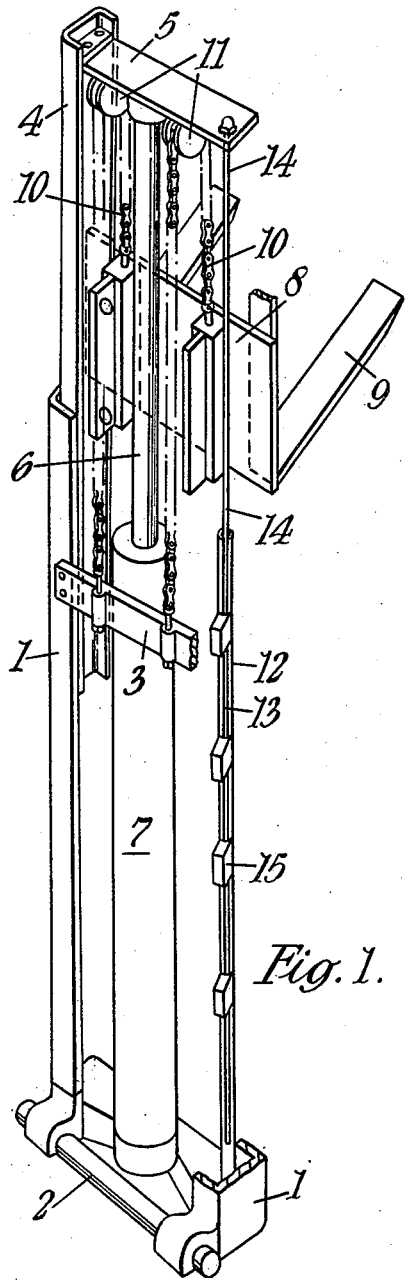
Figure 2:
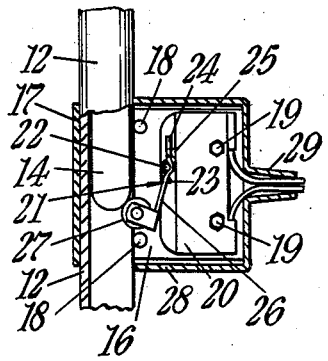
Figure 5:
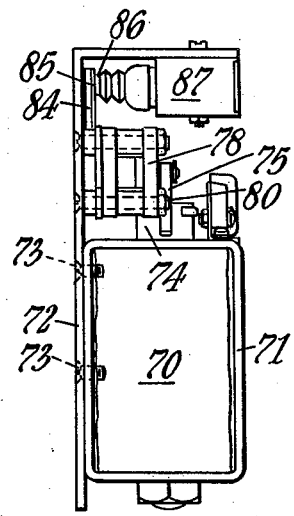
Figure 3:
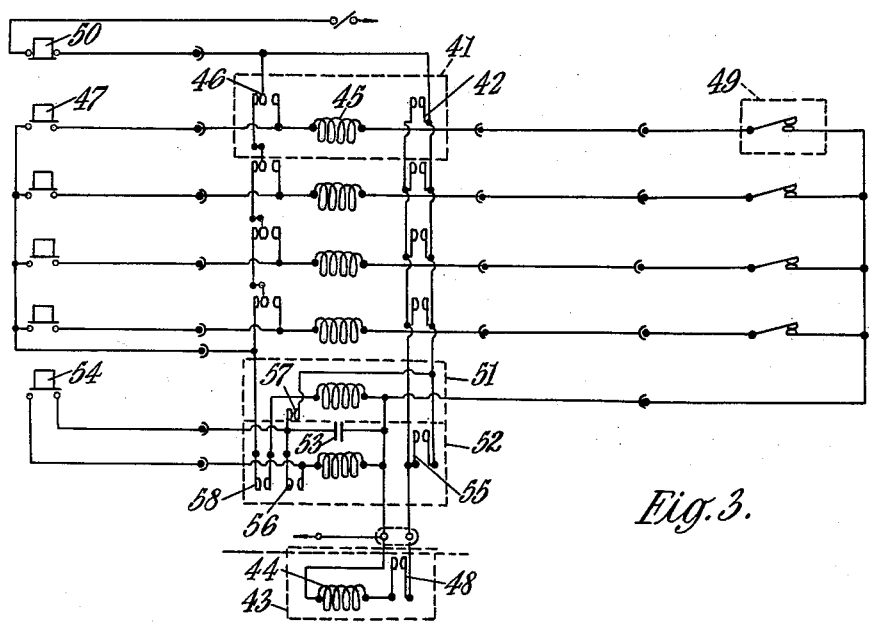

One particular and at present preferred embodiment of the invention is illustrated in the accompanying drawings in which:

FIGURE 1 is a part fragmental isometric view of the lifting gear and load carrier of a so-called fork lift truck.
FIGURE 2 is a vertical section through a sensing unit.
FIGURE 3 is a circuit diagram for the control unit.
FIGURES 4 and 5 are side and end elevational views of the valve controlling device.

Referring now firstly to FIGURE 1 there is shown the load elevating structure mounted ahead of the front wheels for a truck and comprising a pair of vertical channel section guides 1 supported on a crossbar 2 and tied together intermediate their ends by a crossbar 3. Each of these guides slidably receives a smaller channel 4 and these channels are connected at the top by a crossbar 5 in which there is received the top end of an hydraulic ram 6, the cylinder 7 of which is supported between the guides 1.

Suspended between the two channels 4 is the backing plate 8 of the load carrier 9 which is supported by chains 10 extending over pulleys 11 mounted at the top end of the ram.

The load carrier position sensing attachment is fixed parallel with guide 1 and channel 4 on one side and comprises an upright outer sleeve 12 which has a continuous slot 13 extending along its front side. Entering within this sleeve and slidable therein is a tubular rod 14, attached at its upper end to the top crossbar 5 and in consequence movable with the load carrier 9.

Spaced along the sleeve 12 at various heights and intervals as desired is a series of height sensing units 15. In the example shown four such units are illustrated but there may be a greater or lesser number as desired.

FIGURE 2 shows a typical sensing unit comprising a metal bracket 16 having a U-section extension 17 embracing the sleeve 12 to which it is clamped by tightening screws extending through the holes 18. By release of the screws the position of the unit up or down the sleeve 12 may be adjusted and locked by re-tightening of the screws. Secured to the bracket 16 by screws 19 is the casing 20 of a microswitch. This microswitch is operable by a lever 21 which is carried on a pivot 22. The lever 21 is biased by an elbow spring 23 towards a position in which its shorter arm 24 presses inwards against a plunger 25 which is lightly biased in an outward direction. The longer arm 26 of the lever 21 carries a roller 27 on its end and this roller under the influence of spring 23 projects through the slot 13 in through the sleeve 12 into the path of the tubular rod 14 which as shown has a rounded lower end. When the load carrier 9 is in a lowered position the roller 27 and arm 21 are pressed outwardly of the sleeve 12 by the side of the rod 14 and plunger 25 is biased by its spring to a position in which the contacts (not shown) of the microswitch are connected. When the end or the rod 14 in the course of its upward movement passes the roller 27 the parts assume the position shown in FIGURE 2 and the contacts become open.

The rear part of the bracket 16 is shrouded by a flexible casing 28 made of synthetic plastic material and having a tubular outlet 29 for accommodating the electric leads to the microswitch.

FIGURE 3 shows the circuit of a control unit as used with four sensing units as above described distributed along the length of the sleeve 12.

As shown each sensing unit, such as 49, has its associated relay circuit comprising a relay 41 with a pair of contacts 42 which when closed permit flow of current to the solenoid 44 of an hydraulic valve control unit 43. Energisation of the coil 45 in relay 41 is controlled by a single pole changeover switch 46 operated by the relay in conjunction with a selector unit push button switch 47. The latter causes energisation of the relay coil 45 via the normally closed set of contacts on changeover switch 46. When the push button switch is released the relay coil 45 continues to be energised via the normally open contacts of the changeover switch. When energised the relay closes the contacts 42 and thus via a switch 48 in the valve control unit 43 cause energisation of the latter. Relay 41 is held energised via the sensing unit 49. There is a stop button 50 in the series with the common supply lead to all the relays.

To enable the necessary stack and remove heights, which differ for the reason already explained, to be selected from one sensing unit having a single microswitch operable upon the attainment of one single height, a time delay condenser relay circuit is incorporated. It consists of two relays 51, 52 one condenser 53 and one normally open push button 54. Relay 52 has a pair of normally open contacts 55 in parallel with switches such as 42 in the selection relays such as 41. The coil of relay 52 is energised via the normally open push button 54 and held in the energised position via a pair of contacts 56 in the relay 52 which in turn is energised through a pair of normally closed contacts 57 in relay 51. The supply to relay 51 is through a pair of normally open contacts 58 in relay 52.

In operation to gain the extra time to enable the stack height to be reached, after a height has been selected by pushing a button such as 47, button 54 is also pushed. This energises relay 52 closing contacts 55, 56 and 58. When the selected height has been reached the microswitch of the appropriate sensing unit will open and cause release of its associated relay thus completing a circuit through contacts 58 in relay 52 to energise relay 51, opening contacts 57 which cuts off the supply from relay 52. Condenser 53 is in parallel with the coil in relay 52 and has become charged during the period that relay 52 was energised. Condenser 53 now discharges through the coil of relay 52 it being so arranged that it takes a time equivalent to elevating the load carrier a further six inches. When the condenser 53 is completely discharged relay 52 will be de-energised, opening contacts 55 which have been responsible for energising the hydraulic valve unit 43 and contacts 56 and 58 which are associated with controlling relays 51 and 52.

In each height control relay such as 41 the changeover switch 46 contacts and in particular the normally closed pair of these are series linked with similar contacts on the relays corresponding to the other height sensing units in such a way as to interrupt the common supply to the operating push buttons such as 47 when any one of the relays referred to has been energised, thus avoiding the possibility of concurrent selection of more than one stacking or removal height.

The microswitches in the sensing units are normally closed until the stacking height of the particular selected unit is reached at which time the switch opens. Thus if the load carrier is above the stacking height of a particular sensing unit the relay associated with that sensing unit will be inoperative.

Referring now to FIGURES 4 and 5 the hydraulic valve control unit there shown comprises an electromagnetic solenoid 70 housed in a rectangular frame 71 secured to a bracket 72 by screws 73. The plunger 74 of the solenoid is coupled by a pivoted link 75 to an arm 76 which is pivoted at one end on a pin 77 carried on a bridge structure 78 through which there passes a longitudinally movable valve operating bar 79. This bar is slidably located between a first pair of guide bushes 80 associated with the bridge structure and a second pair of guide bushes 81 near the opposite edge of the bracket 72. At its free end the arm 76 carries a relatively large diameter roller 82 adapted to co-operate with an upstanding lug 83 on the valve operating bar 79.

When the solenoid coil is energised the plunger 74, which is spring loaded outwardly by a spring (not shown) within the solenoid casing, moves inwardly against the action of this spring so that the roller 82 engages the edge and enters behind the lug 83 thereby locking the valve operating bar 79 in the operative position to which it has previously been moved by the truck driver to actuate the ram to raise the load carrier.

The bar 79, as shown in FIGURE 4, is integral with the plunger 90 which is slidable in the block 91 of the control valve which has a high pressure fluid inlet 92, an outlet 93 to the lifting ram and an exhaust outlet 94 connected to a fluid reservoir. The direction of fluid flow depends upon the position of the reduced diameter portion 96 of the plunger 90 the axial position of which is controlled by the manually operable lever 97 pivoting on pin 98 and coupled by pivot 99 to the bar 79. The plunger 90 is biased away from both extreme positions by a spring 60 backing against washers 61 on the reduced diameter end 95 of plunger 90.

To ensure that the roller 82 does not attempt to move prematurely to its bar locking position, that is for example when the bar 79 is in the neutral position there is formed on a side extension 84 of the bar 79 a cam surface 85 which operates a plunger 86 of a microswitch 87 when the bar is in the ram operating position shown in full lines in FIGURE 4. The microswitch 87 is connected in series with the coil of solenoid 70 with the result that the roller cannot be moved until the cam surface 85 has moved the plunger 86 to close the contacts of microswitch 87.

Summarising the mode of operation of the equipment therefore, the button for the desired lifting height is depressed together with (if the load carrier is carrying a pallet which has to be deposited) the delay button. The hydraulic valve lever 97 is pulled, which moves control bar 79 and plunger 90 to operate the lift ram. Bar 79 operates microswitch 87 through cam 85 energising the solenoid 70 and locking the bar 79 against return movement.

The load carrier 9 now rises taking with it the rod 14 sliding in the sleeve 12.

When the end of rod 14 passes the roller of the preselected sensing unit the microswitch associated with the latter opens the circuit holding the relay as previously explained allowing this to open and in consequence breaking the circuit to the solenoid and permitting outward movement of plunger 74 and withdrawal of arm 76 and roller 82. This permits the valve operating bar 79 to return to a central neutral position under the action of spring 60 and thus arrests the motion of the ram when the required height is reached.

Where the load carrier 9 is to be used, with pallets of different known depths necessitating different characteristic delays a series of alternatively selectable delay circuits each similar to the one which has been described may be incorporated.

I claim:

1. In combination with a vehicle of the kind referred to having an hydraulically operated ram for raising a load carrier platform, an attachment having a plurality of vertically separated units each incorporating an electric switch for sensing the height of said load carrier platform, a control unit for pre-selecting for operation a particular one of said sensing units and a device including a solenoid for controlling under direction of the said electric switch of the selected sensing unit the position of a valve in an hydraulic circuit by which the ram is actuated.

2. A combination as set forth in claim 1 in which said sensing unit switches are mechanically operated.

3. A vehicle as set forth in claim 2 in which each said switch is operable by an associated lever which projects into the path of movement of a member which moves with said load carrier platform.

4. A combination as set forth in claim 1 including means for preventing operation of the said solenoid until the hydraulic valve operating member has assumed a particular operating position.

5. A vehicle as set forth in claim 4 in which said prevention means is a microswitch in series with the coil of said solenoid and operated only when said operating member is in said particular operating position.

6. A combination as set forth in claim 1 in which said solenoid operates to prevent return motion of a manually operable hydraulic valve control member until or shortly after operation of the selected sensing unit.

7. A combination as set forth in claim 1 in which said solenoid operates through a fluid operated device to control the position of the said hydraulic control valve.

8. A combination as set forth in claim 1 in which on attainment of said pre-selected height the switch of the appropriate sensing unit is opened so as to interrupt operation of said solenoid.

9. In combination with a vehicle of the kind referred to having an hydraulically operated ram for raising a load carrier platform and a valve for controlling the operation of said ram, an attachment comprising a plurality of vertically separated units for sensing the height of said load carrier platform, a control unit for pre-selecting for operation a particular one of the single unit, a device for controlling under the direction of a selected sensing unit the position of the control valve in the hydraulic circuit by which the ram is elevated, and selectively operable means associated with the control unit for slightly delaying the operation of the valve position controlling device after operation of the selected sensing unit so as to allow limited further elevation of and load carrier platform in a load stacking operation.

References Cited in the file of this patent

UNITED STATES PATENTS

| | | |
|---|---|---|
| 1,268,110 | Furlow | June 4, 1918 |
| 2,106,878 | Sinclair | Feb. 1, 1938 |
| 2,571,508 | Whelan et al. | Oct. 16, 1951 |
| 2,653,679 | Hamilton | Sept. 29, 1953 |
| 2,726,774 | Newsom et al. | Dec. 13, 1955 |
| 2,790,513 | Draxler | Apr. 30, 1957 |
| 2,816,624 | Asheim et al. | Dec. 17, 1957 |
| 2,946,406 | Henry | July 26, 1960 |
| 3,011,661 | Thomas et al. | Dec. 5, 1961 |

FOREIGN PATENTS

| | | |
|---|---|---|
| 211,090 | Australia | Oct. 24, 1957 |